United States Patent Office 2,953,076
Patented Sept. 20, 1960

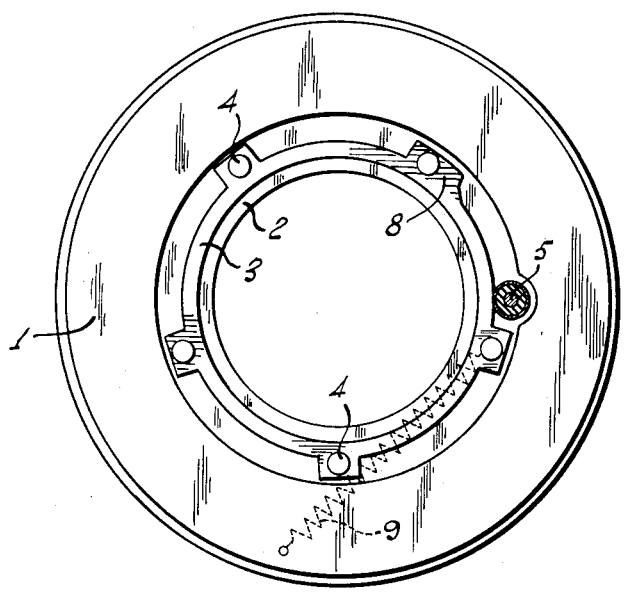
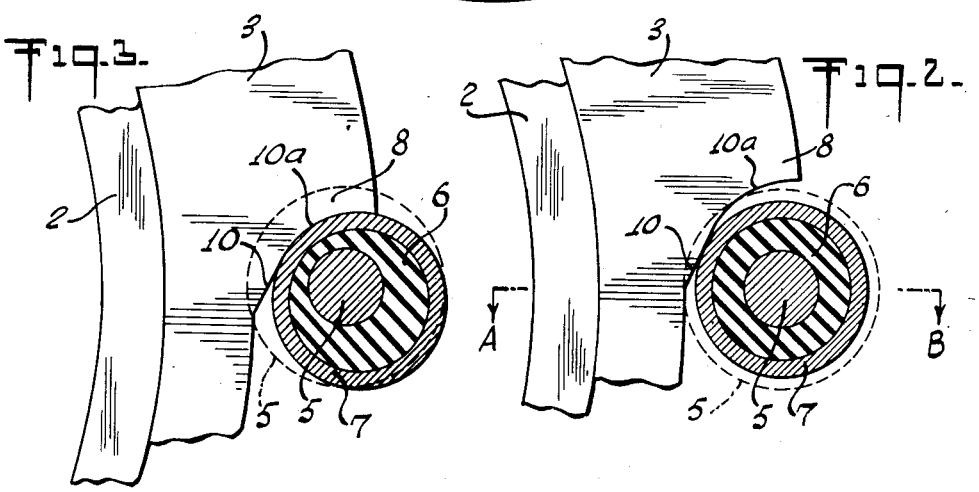
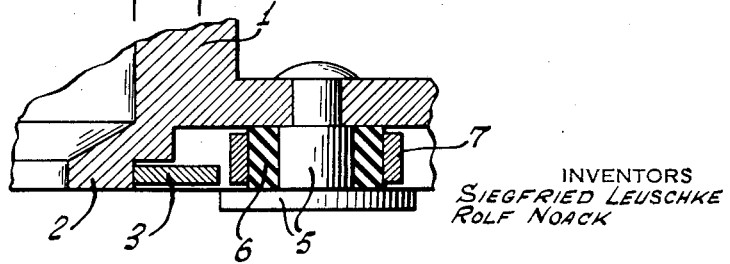

2,953,076

PHOTOGRAPHIC OBJECTIVE LENS SHUTTER

Siegfried Leuschke and Rolf Noack, Dresden, Germany, assignors to VEB Kamera- und Kinowerke Dresden Filed Feb. 8, 1957, Ser. No. 639,097

Claims priority, application Germany Feb. 11, 1956

1 Claim. (Cl. 95—63)

This invention relates to improvements in photographic lens shutters of the type mounted between the lens, and has particular relation to a shock-absorbing stop assembly for halting movement of the shutter blades or sectors.

In known arrangement for stopping movement of the shutter parts at the end of the exposure, the shutter blades or sectors are generally stopped by rubber cushions. In such conventional assemblies, the shutter elements or blades to be stopped come in direct contact with these rubber cushions. Since the shutter blades are thin, they tend to cut through the rubber cushions within a short time, retarding the effectiveness of the cushions as shock absorbers.

An object of the present invention is to provide a cushion arrangement for arresting the movement of the shutter blades and acting as a shock-absorber therefor, in which the aforementioned disadvantage is avoided.

Another object of the invention is the provision of a shock-absorbing device of the character described in which the rubber cushion is provided with a jacket of hard material which can withstand repeated contact by the shutter parts.

Another object of the invention is the provision of a shock-absorbing device of the character described in which the shutter parts at the area of contact with the shock-absorber are shaped to correspond with the shape of the cushion jacket. In addition, in order to insure an effective absorption of the kinetic energy inherent in the shutter elements, the latter are provided with sloping approach surfaces. Thus the braking force increases as the shutter element approaches the stop element.

Additional objects and advantages of the invention will be apparent in the course of the following specification when taken in connection with the accompanying drawings, in which:

Fig. 1 is an elevational view of a shutter assembly made in accordance with the invention, and in which all the shutter elements not essential to illustrate the invention are omitted;

Fig. 2 is an enlarged elevational view of part of the shutter assembly of Fig. 1, showing the rubber cushion at the moment in which its braking action is initiated;

Fig. 3 is a partial elevational view similar to Fig. 2, but showing the rubber cushion at the termination of movement of the shutter mechanism;

Fig. 4 is a section taken along line A—B of Fig. 2.

Referring to Fig. 1, the shutter mechanism of the invention is shown as comprising a shutter housing 1 mounted on a camera body concentric with and surrounding the objective lens tube or mounting 2, in the usual manner. A drive ring 3 for the shutter blades or sectors is mounted for turning movement around the lens tube 2, the drive ring 3 having on its outer face a pluraliy of projecting pins 4 to which the shutter blades or sectors are coupled for pivoting movement through slots on the shutter blades. The shutter blades or sectors are of the usual type, and are not shown herein for clarity of illustration, since their construction and manner of mounting is very well known.

The drive ring 3 is turned by the usual spring means 9, whereby the shutter blades are opened and closed. In the structure of Fig. 1, the spring 9 is arranged to turn the drive ring 3 in a clockwise direction upon actuation of the camera exposure release member.

A rubber cushion 6 is fixedly mounted in the shutter housing 1 adjacent the outer circumference of drive ring 3, as by a rivet bolt 5 which extends through the center thereof. The cushion 6 may be of the cylindrical shape shown, and is provided with an outer jacket or sleeve 7 which is made of steel or other tough material which can withstand wear. The drive ring 3 is provided with an extension 8 which projects radially outwardly of the circumference thereof and is positioned to engage the jacket 7 of the rubber cushion 6 during operation of the shutter. The portion of extension 8 which comes in contact with the steel jacket 7 is arcuately shaped as indicated at 10a to conform to the cylindrical shape of said jacket in order to provide a large area of engagement.

The extension 8 also has a straight sloping surface 10 located forwardly of an leading to the arcuate surface 10a. Toward the end of the clockwise turning movement of the sector drive ring 3 caused by spring 9 during the camera exposure, the sloping surface 10 first comes in contact with the outer circumference of jacket 7. In this manner, the braking action increases as the jacket 7 is pressed to one side and displaced due to deforming of the rubber cushion 6, as shown in Figs. 2 and 3. In this action, the inclined surface 10 acts as a cam to press the steel jacket 7 forwardly and radially outwardly away from the ring 3, and the jacket 7 is actually displaced in this direction owing to the resilience of the rubber cushion 6. It will be observed in Fig. 3 that the cushion 6 is depressed on the side toward the ring 3 and expands on the other side. The cam action of inclined surface 10 is thus effective in cooperating with the resilient cushion 6 to progressively brake the movement of drive ring 3.

Finally, the arcuate surface 10a of cam extension 8 receives the jacket 7 which seats itself in said surface 10a and movement of the drive ring 3 is thereby halted, as shown in Fig. 3.

While the cushion shown herein is preferably made of rubber, other resilient or yieldable materials may be substituted, such as foam rubber, leather, etc.

While a preferred embodiment of the invention has been shown and described herein, it is obvious that changes in structure in form, additional and omission may be made without departing from the spirit and scope of the invention.

What is claimed is:

A shock absorbing stop assembly for halting movement of camera shutters; comprising a shutter housing, a spring-biased drive ring for moving the blades of said shutter, a resilient cushion, bolt means through the center of said resilient cushion for fixedly mounting same to said shutter housing, the longitudinal axis of said bolt means being parallel to the axis of rotation of said drive ring, a wear resistant sleeve around said cushion, said drive ring having on its outer circumference cam means projecting substantially radially therefrom for engaging and displacing said sleeve to compress one side of said cushion when said shutter is approaching a stopped and closed position, said cam means having an arcuate-shaped portion to conform to the shape of the outer surface of said sleeve and also having a sloping portion tangential to and leading to said arcuate portion.

References Cited in the file of this patent

UNITED STATES PATENTS

| | | |
|---|---|---|
| 1,274,262 | Gruss | July 30, 1918 |
| 2,504,393 | Cook | Apr. 18, 1950 |
| 2,580,975 | Tea | Jan. 1, 1952 |
| 2,677,851 | Beyer | May 11, 1954 |
| 2,691,331 | Willcox | Oct. 12, 1954 |
| 2,882,548 | Roethel | Apr. 21, 1959 |
| 2,893,720 | Bair | July 7, 1959 |